United States Patent
Akiba et al.

(10) Patent No.: US 11,418,722 B2
(45) Date of Patent: Aug. 16, 2022

(54) EXPOSURE CONTROL DEVICE, EXPOSURE CONTROL METHOD, AND STORAGE MEDIUM

(71) Applicant: DENSO CORPORATION, Kariya (JP)

(72) Inventors: Kazuyoshi Akiba, Kariya (JP); Toshikazu Murao, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/375,789

(22) Filed: Jul. 14, 2021

(65) Prior Publication Data
US 2022/0021799 A1  Jan. 20, 2022

(30) Foreign Application Priority Data
Jul. 15, 2020  (JP) .............................. JP2020-121528

(51) Int. Cl.
H04N 5/235 (2006.01)
H04N 5/232 (2006.01)
H04N 9/04 (2006.01)

(52) U.S. Cl.
CPC ....... *H04N 5/2353* (2013.01); *H04N 5/23229* (2013.01); *H04N 9/0451* (2018.08)

(58) Field of Classification Search
CPC ............. H04N 5/2351; H04N 5/23229; H04N 9/0451; H04N 7/18; H04N 5/2352
See application file for complete search history.

(56) References Cited

U.S. PATENT DOCUMENTS

| | | | | |
|---|---|---|---|---|
| 4,969,045 A | * | 11/1990 | Haruki | H04N 5/2351 348/254 |
| 5,111,301 A | * | 5/1992 | Haruki | H04N 5/2351 706/900 |
| 6,188,434 B1 | * | 2/2001 | Tsuchiya | H04N 9/0451 348/E5.04 |
| 2007/0001512 A1 | * | 1/2007 | Sato | H04N 7/18 307/9.1 |
| 2012/0162426 A1 | | 6/2012 | Murao | |
| 2020/0334477 A1 | * | 10/2020 | Aoi | G06V 40/174 |

FOREIGN PATENT DOCUMENTS

| | | |
|---|---|---|
| JP | H08-240833 A | 9/1996 |
| JP | H10-066060 A | 3/1998 |
| JP | 2013-160895 A | 8/2013 |
| JP | 2014-146979 A | 8/2014 |

\* cited by examiner

*Primary Examiner* — Hung H Lam
(74) *Attorney, Agent, or Firm* — Maschoff Brennan

(57) ABSTRACT

An exposure control device includes a feature quantity calculation section, a priority setting section, and a control amount calculation section. The feature quantity calculation section calculates feature quantities of a plurality of pixels in a frame image acquired by the imaging section which are different from luminance values. The priority setting section sets priority in accordance with the feature quantities so that the luminance value(s) of one or more pixels with high feature quantities calculated by the feature quantity calculation section are preferentially used to calculate an exposure control amount. The control amount calculation section calculates the exposure control amount based on the luminance values of the pixels and the priority set by the priority setting section.

18 Claims, 4 Drawing Sheets

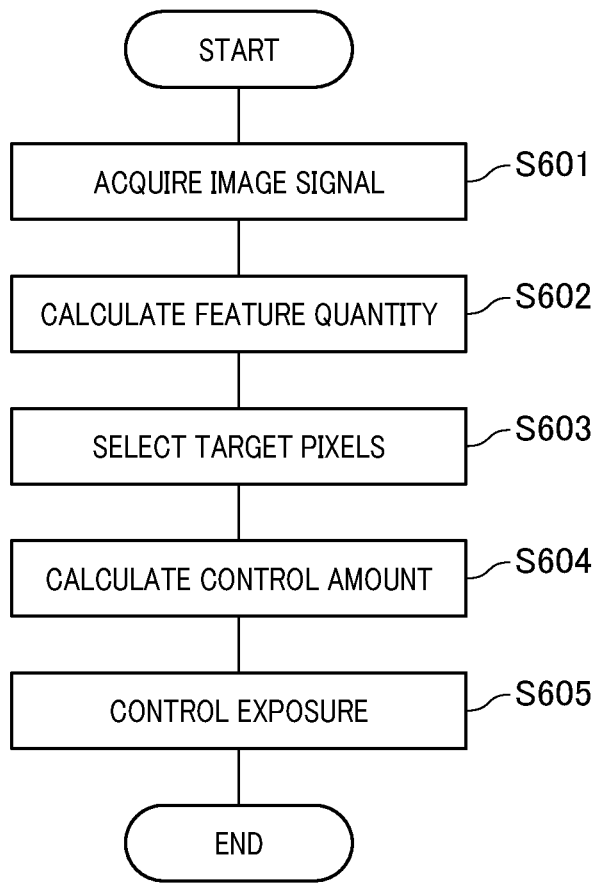

EXPOSURE CONTROL DEVICE, EXPOSURE CONTROL METHOD, AND STORAGE MEDIUM

CROSS-REFERENCE TO RELATED APPLICATION

The present application is based on and claims the benefit of priority from earlier Japanese Patent Application No. 2020-121528 filed Jul. 15, 2020, the description of which is incorporated herein by reference.

BACKGROUND OF THE INVENTION

Technical Field

The present disclosure is related to an exposure control device, an exposure control method, and a storage medium.

Related Art

A device for controlling exposure of a camera installed in a moving object such as a vehicle is known.

SUMMARY

As an aspect of the present disclosure, an exposure control device for controlling exposure of an imaging section installed in a moving object is provided. The device includes: a feature quantity calculation section configured to calculate feature quantities of a plurality of pixels in a frame image acquired by the imaging section which are different from luminance values; a priority setting section configured to set priority in accordance with the feature quantities so that the luminance value(s) of one or more pixels with high feature quantities calculated by the feature quantity calculation section are preferentially used to calculate an exposure control amount; and a control amount calculation section configured to calculate the exposure control amount based on the luminance values of the pixels and the priority set by the priority setting section.

BRIEF DESCRIPTION OF THE DRAWINGS

In the accompanying drawings:

FIG. 6 is a flowchart showing an example of operation corresponding to the priority setting process shown in FIG. 5.

DETAILED DESCRIPTION OF THE PREFERRED EMBODIMENTS

A device for controlling exposure of a camera installed in a moving object such as a vehicle is known. For example, the device described in JP 2013-160895 A uses an in-vehicle GPS unit to obtain changes in the position of an in-vehicle camera whose exposure is settable, and uses a tilt sensor to obtain changes in the optical axis direction. Further, this device sets, in the images acquired by the in-vehicle camera, one or more image regions whose positions are variable for each image acquisition timing. The device also acquires the brightness of each of the pixels constituting the image region(s), and calculates an evaluation value based on the acquired brightness. The evaluation value is a value for determining whether the image region is an invalid region. An invalid region is a region where it is assumed that image processing cannot be carried out due to overexposure or underexposure. When any of the image regions is determined to be invalid, based on at least one of a change in the position of the in-vehicle camera and a change in the optical axis direction of the in-vehicle camera, the device changes the position coordinates of the set image regions to position coordinates of certain regions.

According to the device described in JP 2013-160895 A, even when the position or the optical axis direction of the in-vehicle camera changes with the movement of the vehicle, the image regions are changed at each image acquisition timing so that the brightness of the image is always set to a value that can be image-processed. That is, even when the vehicle moves or tilts and an area with high brightness, such as the sky, appears in the image acquired by the in-vehicle camera, the exposure of the camera installed in the vehicle can be set appropriately.

Images acquired in this type of device can be used for target detection by image recognition, visual ambient monitoring, and the like. Therefore, this type of device is required to perform exposure control appropriately so that the correct exposure that makes the target of image recognition or monitoring suitable for image recognition or monitoring can be achieved.

The present disclosure has been devised in view of the above-exemplified circumstances and the like. That is, the present disclosure provides, for example, an exposure control device, an exposure control method, and a storage medium capable of controlling the exposure of an imaging section installed in a moving object such as a vehicle even more appropriately.

Embodiments

An embodiment of the present disclosure will be described below with reference to the drawings. If various modifications applicable to one embodiment are inserted in the middle of a series of descriptions related to the embodiment, understanding of the embodiment may be hindered. Thus, modifications will not be inserted in the middle of a series of descriptions related to the embodiment but will be described together afterward.

In-vehicle System Configuration

Figure 1:
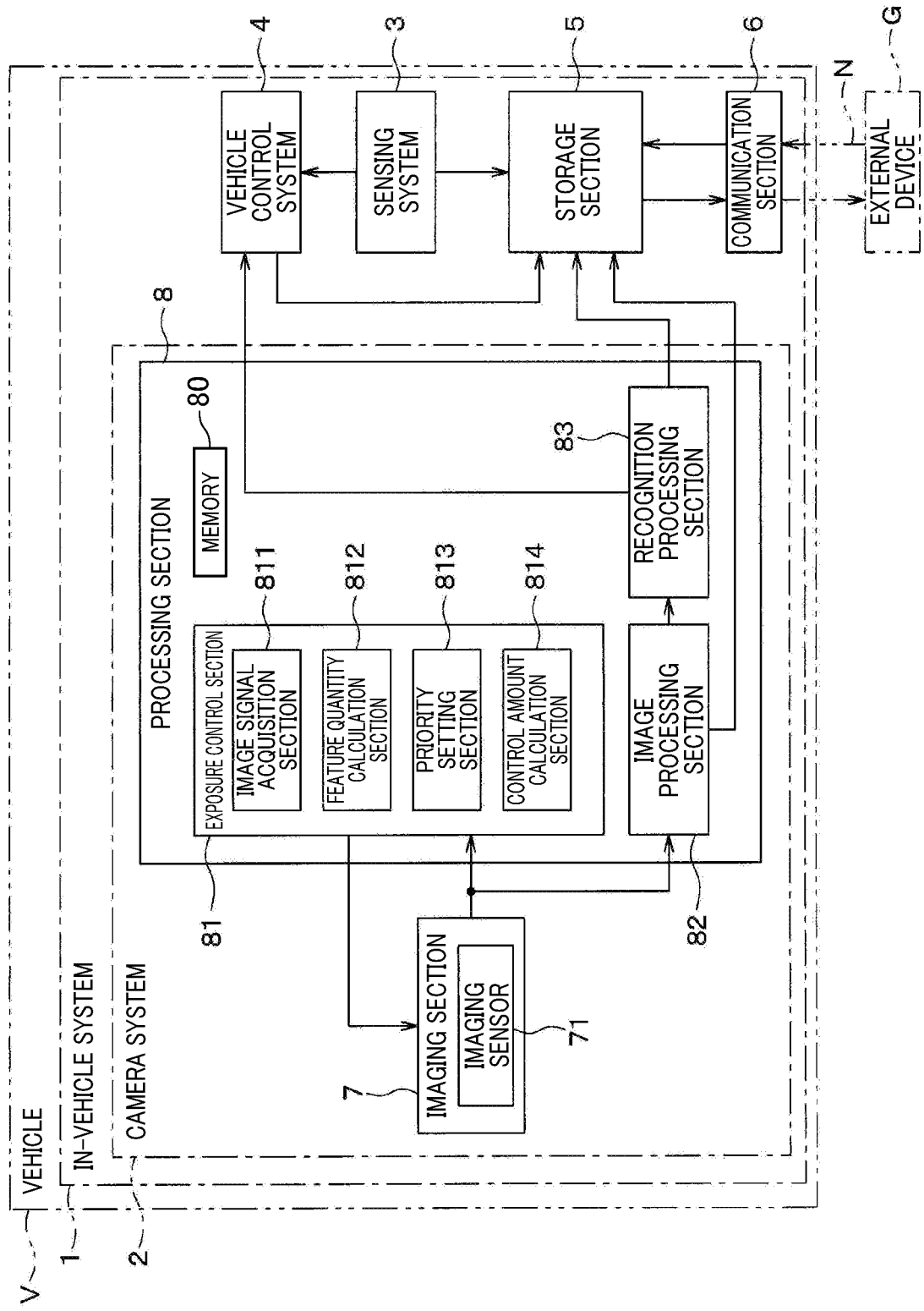
FIG. 1 is a block diagram showing a general configuration of an in-vehicle system including an exposure control device according to an embodiment of the present disclosure.

Referring to FIG. 1, a vehicle V as a moving object is provided with an in-vehicle system 1. The in-vehicle system 1 includes a camera system 2, a sensing system 3, a vehicle control system 4, a recording section 5, and a communication section 6.

The camera system 2 is configured to capture images of the surroundings of the vehicle V (for example, the view ahead and/or behind) and output image output signals corresponding to the image capture results to the recording section 5. Further, the camera system 2 is configured to perform image recognition for a target around the vehicle V based on the image capture results and output the image recognition results to the vehicle control system 4 and the recording section 5. The details of the configuration of the camera system 2 will be described later.

The sensing system 3 is provided so as to sense the state or behavior of the vehicle V. That is, the sensing system 3 includes various sensors such as an acceleration sensor, a vehicle speed sensor, a positioning sensor, a steering angle sensor, a yaw rate sensor, a temperature sensor, a door lock/unlock detection sensor, a radar sensor, and an ultrasonic sensor. The sensing system 3 is configured to output information or signals corresponding to the state or behavior of the vehicle V, sensed based on the outputs of these various sensors, to the vehicle control system 4 and the recording section 5.

The vehicle control system 4 is configured to execute driving control or driving automation control such as acceleration, braking, and steering of the vehicle V, based on the information or signals output from the camera system 2 and the sensing system 3. "Driving automation control" include control for achieving "driver assistance" corresponding to level 1, "advanced driver assistance" corresponding to level 2, or "automated driving" corresponding to level 3 or higher levels specified in the standard "SAE 33016" published by SAE International. That is, the in-vehicle system 1 has a configuration corresponding to the "driving automation system" or the "automated driving system" in "SAE 33016". SAE is an abbreviation for Society of Automotive Engineers.

The recording section 5 is provided to record, in a rewritable manner, a certain amount of information or signals output from the camera system 2, the sensing system 3, and the vehicle control system 4. That is, the recording section 5 is configured to function as a drive recorder by cooperating with the camera system 2. Further, the recording section 5 is configured to function as an event data recorder that records information representing the behavior of the vehicle V by cooperating with the sensing system 3 and the vehicle control system 4.

The in-vehicle system 1 is connected to an external device G provided outside the vehicle V via a communication line N so that information can be exchanged. The communication section 6 is provided in the in-vehicle system 1 to execute information communication between the in-vehicle system 1 and the external device G via the communication line N.

The external device G is, for example, a communication partner device in V2X communication. V2X is an abbreviation for Vehicle-to-X, that is, Vehicle-to-Everything. Specifically, the external device G is, for example, a server device in a platform related to mobile services (for example, a MaaS platform). MaaS is an abbreviation for Mobility as a Service. Alternatively, the external device G is, for example, a mobile terminal device (for example, a smartphone or the like) brought into the vehicle V by an occupant of the vehicle V. The communication section 6 is configured so that a plurality of types of external devices G can be sequentially or simultaneously connected to the in-vehicle system 1.

Camera System

The camera system 2 includes an imaging section 7 and a processing section 8. The imaging section 7 is configured to capture a plurality of frame images at different timings within a predetermined period with an imaging element(s) 71 such as CMOS image sensors. CMOS is an abbreviation for Complementary Metal Oxide Semiconductor.

The processing section 8 is a so-called camera ECU, and is provided to control the imaging operation carried out by the imaging section 7 and execute various kinds of processing on the image signals generated from the imaging operation. That is, the processing section 8, which serves as the exposure control device of the present disclosure for executing the exposure control method and the exposure control program of the present disclosure, is configured to control the exposure of the imaging section 7 installed in the vehicle V.

In the present embodiment, the processing section 8 has a configuration as a so-called in-vehicle microcomputer provided with a non-volatile rewritable memory 80, and a CPU, ROM, RAM, input/output interface, and the like (not shown in the figures). The non-volatile rewritable memory 80 is, for example, a computer-readable non-transitory tangible storage medium such as a hard disk, EEPROM, flash ROM, or the like. That is, the processing section 8 is configured to implement various functional configurations on the in-vehicle microcomputer by reading programs stored in the ROM or non-volatile rewritable memory 80 and executing them on the CPU.

Specifically, in the present embodiment, the processing section 8 includes, as functional configuration sections implemented on the in-vehicle microcomputer, an exposure control section 81, an image processing section 82, and a recognition processing section 83. Each of these functional configuration sections provided in the processing section 8 will now be described.

The exposure control section 81 is provided to execute exposure control of the imaging element 71 based on image signals acquired by the imaging section 7 and output from the imaging section 7. Specifically, the exposure control section 81 is configured to calculate the exposure control amount based on the pixel values, that is, the luminance values of pixels in the photometric area in a frame image acquired by the imaging section 7. Further, the exposure control section 81 is configured to output the calculated exposure control amount to the imaging section 7. The details of the functional configuration of the exposure control section 81 will be described later.

The image processing section 82 is provided to generate and output a signal for recognition processing and a signal for visual observation by processing an image signal acquired from the imaging section 7. The signal for recognition processing is an image output-signal to be subjected to image recognition processing in the recognition processing section 83. The signal for visual observation is an image output-signal for the drive recorder to be viewed with the naked eyes. That is, the image processing section 82 generates an image output-signal to be subjected to image recognition processing and an image output-signal for the drive recorder function separately based on an image signal acquired by the same imaging section 7.

The recognition processing section 83 is provided to execute image recognition processing for a target in the imaging range of the imaging section 7 by using the signals for recognition processing output from the image processing section 82. The recognition processing section 83 outputs the results of the image recognition processing for the target to the vehicle control system 4 and the recording section 5. Note that the configurations of the image processing section 82 and the recognition processing section 83 are already well known or known at the time of filing of the present application. Therefore, further details of the configurations of the image processing section 82 and the recognition processing section 83 will be omitted in the present specification.

Exposure Control Section

The exposure control section 81 includes an image signal acquisition section 811, a feature quantity calculation section 812, a priority setting section 813, and a control amount calculation section 814. The image signal acquisition section 811 is provided to acquire image signals from the imaging section 7.

The feature quantity calculation section 812 is provided to calculate a feature quantity, which is different from the luminance value, of each of the pixels of an image signal, i.e., a frame image, acquired by the image signal acquisition section 811. "The feature quantity, which is different from the luminance value," is a feature quantity that is different from a value corresponding to the luminance value itself (that is, for example, an 8-bit value between 0 and 255 representing the luminance value). "The feature quantity, which is different from the luminance value," will be hereinafter simply referred to as "feature quantity". In the present embodiment, the feature quantity is edge information representing the relationship between the pixel values of a pixel of interest and pixels around it. Specifically, the feature quantity includes, for example, edge intensity extracted using the known Sobel filter or the like.

The priority setting section 813 is provided to set the priority according to the feature quantity. The priorities are set so that the luminance values of pixels with higher feature quantities calculated by the feature quantity calculation section 812 are preferentially used for the calculation of the exposure control amount. Specifically, in the present embodiment, the priorities are "weights" corresponding to the feature quantities. That is, the priority setting section 813 assigns higher priorities, i.e., higher weighting coefficients, to pixels with larger feature quantities.

In the present embodiment, the priority setting section 813 preferentially uses pixels having larger feature quantities (for example, pixels having feature quantities equal to or larger than a threshold value) for calculating the exposure control amount. "Preferentially uses pixels having feature quantities equal to or larger than a threshold value for calculating the exposure control amount" means that the influence α1 of pixels with feature quantities equal to or larger than the threshold on the exposure control amount is larger than the influence α2 of the other pixels on the exposure control amount (α1>α2), where α2≥0.

Figure 2:
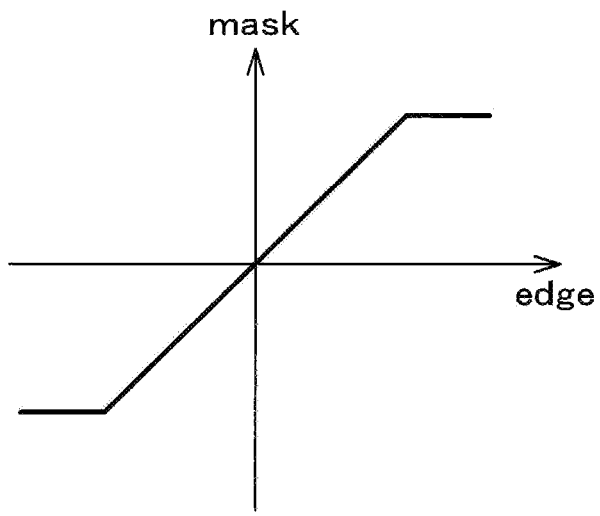
FIG. 2 is a graph showing an example of a priority setting process performed by a priority setting section shown in FIG. 1.
Figure 3:
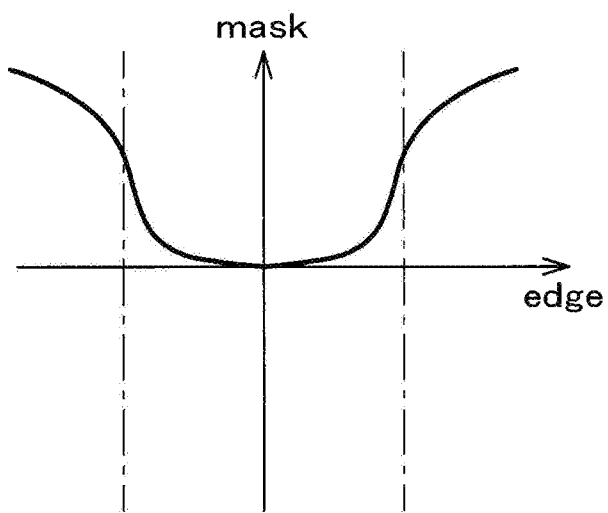
FIG. 3 is a graph showing another example of the priority setting process performed by the priority setting section shown in FIG. 1.

FIG. 2 shows an outline of linear weighting provided with upper and lower limits. FIG. 3 shows an outline of weighting that changes non-linearly when crossing the thresholds indicated by alternate long and short dash lines. In FIGS. 2 and 3, "edge" and "mask" are as shown in the following expressions.

$$edge[x][y]=f(img[x][y])$$

$$mask[x][y]=g(edge[x][y])$$

[x][y]: Two-dimensional coordinates in frame image
img[x][y]: Pixel value, i.e., luminance value
f(v): Function (Sobel filter, for example) for calculating the feature quantity from pixel v and its surrounding pixels
g(v): Function for carrying out upper- and lower-limit processing or weighting on pixel v Returning to FIG. 1, the control amount calculation section 814 calculates the exposure control amount based on the luminance values of the pixels in the photometric area in the frame image as well as their priority set by the priority setting section 813. The exposure control amount is a control amount for controlling the exposure of the imaging section 7, and is, for example, the f-number, exposure time, or AGC gain. AGC is an abbreviation for Automatic Gain Control.

Effects

Next, the outline of the operation of the configuration of the present embodiment and the outline of the processes included in the exposure control method and exposure control program according to the present embodiment will be described together with the effects provided by it with reference to the drawings.

The imaging section 7 captures a plurality of frame images at different timings within a predetermined period by an imaging element(s) 71. For example, the imaging section 7 captures frame images at a frame rate of 10 to 60 frames/sec. Specifically, for example, the imaging section 7 captures 40 frame images per second at equal intervals, that is, at 25 ms intervals.

The processing section 8 processes image signals acquired by the imaging section 7 installed in the vehicle V. Specifically, the exposure control section 81 controls the exposure of the imaging element 7 based on image signals output from the imaging section 7. The image processing section 82 acquires a plurality of frame images as image signals from the imaging section 7. Then, the image processing section 82 processes the acquired frame images to generate and output a recognition frame image as a signal for recognition processing, and also a storage frame image as a signal for visual recognition. That is, the image processing section 82 generates and outputs a recognition frame image used for image recognition processing and a storage frame image stored in the recording section 5 to be viewed with the naked eyes.

The storage frame image output from the image processing section 82 is stored in the recording section 5. The storage frame image is suitably used as, for example, an image output signal for a drive recorder by being sent to an image display device in the vehicle interior (not shown in the figure). Alternatively, the storage frame image is suitably used as, for example, an image output signal for a drive recorder by being sent to an external device G which is a portable terminal device brought into the vehicle V. Further, the storage frame image is suitable used as, for example, MaaS data for map generation, falling object detection, faulty vehicle detection, or the like by being sent to a server device as the external device G.

The recognition frame image output from the image processing section 82 is input to the recognition processing section 83. The recognition processing section 83 executes recognition processing for a target in the imaging range of the imaging section 7 by using the frame image for recognition output from the image processing section 82. The recognition processing section 83 outputs the results of the image recognition processing to the vehicle control system 4 and the recording section 5.

Figure 4:
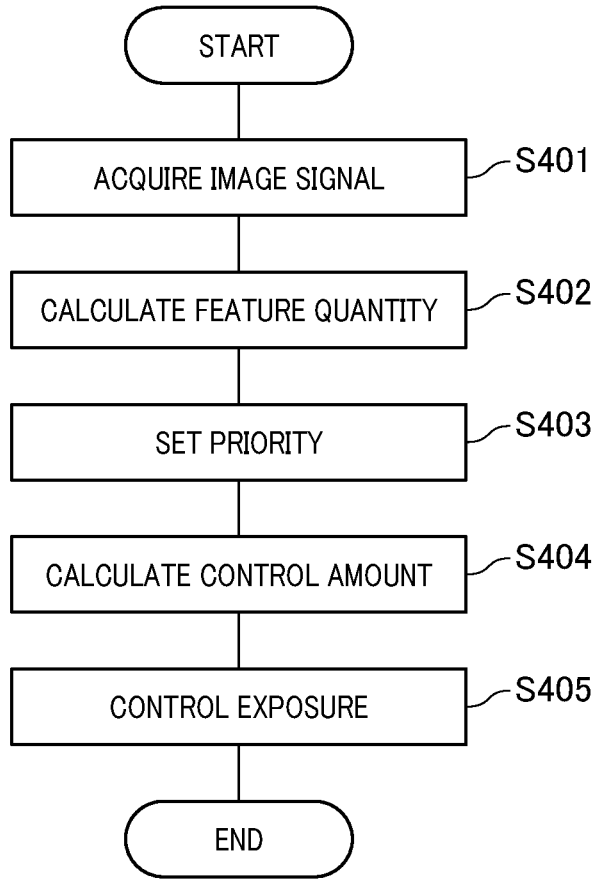
FIG. 4 is a flowchart showing an example of operation of an exposure control section shown in FIG. 1.

The exposure control process carried out by the exposure control section 81 will be described in detail below with reference to FIGS. 1 to 3 and the flowchart shown in FIG. 4. In the flowchart, "S" is an abbreviation for "step".

First, in step 401, the exposure control section 81 acquires an image signal, that is, a frame image from the imaging section 7. The processing of step 401 corresponds to the operation of the image signal acquisition section 811.

Next, in step 402, the exposure control section 81 calculates a feature quantity of each of the pixels in the frame image acquired that is different from the luminance value. The processing of step 402 corresponds to the operation of the feature quantity calculation section 812, that is, the processing for calculating the feature quantities.

After that, in step 403, the exposure control section 81 executes processing for setting the priority in accordance with the feature quantity so that the luminance values of pixels with higher calculated feature quantities are preferentially used for the calculation of the exposure control amount. The processing of step 403 corresponds to the operation of the priority setting section 813, that is, the processing for setting priority. Specifically, for example, when the pixels are weighted as in the mode shown in FIG. 3, the pixels with feature quantities equal to or larger than the threshold will be preferentially used to calculate the exposure control amount.

Next, in step 404, the exposure control section 81 calculates the exposure control amount based on the luminance values of the pixels in the photometric area of the frame image and their priority set earlier. The processing of step 404 corresponds to the operation of the control amount calculation section 814, that is, the processing for calculating the exposure control amount.

Specifically, the exposure control section 81 calculates the average ave of the luminance values in the photometric area as shown in the following expression. Such an average ave may also be referred to as a "weighted average".

$$\text{ave} = \Sigma\Sigma ZZ\text{img}[x][y] \cdot \text{mask}[x][y] / \Sigma\Sigma \text{mask}[x][y]$$

Further, the exposure control section 81 calculates a correction value using the calculated average ave. Specifically, for example, the correction value is a value obtained by dividing the control target value by the calculated average ave. The exposure control section 81 calculates the current exposure control amount by correcting the previous value of the exposure control amount with the correction value. Finally, in step 405, the exposure control section 81 outputs the exposure control amount calculated in step 404 to the imaging section 7. The exposure of the imaging section 7 is thus controlled.

In the present embodiment, pixels having high feature quantities in the frame image that correspond to a target, which may be the object to be detected by image recognition or viewed with the naked eyes, are preferentially used for calculating the exposure control amount. This advantageously reduces the influence of the pixels corresponding to the background region such as the sky or an outer wall of a building, which is unlikely to be the target of image recognition or visual observation, on the exposure control amount. Therefore, according to the present embodiment, provided are an exposure control device, an exposure control method, and an exposure control program capable of controlling the exposure of the imaging section 7 installed in the vehicle V even more appropriately than the conventional art.

An appropriate image recognition result or an appropriate region set result based on the image recognition result cannot be obtained if the exposure control amount is inappropriate. In this regard, the present embodiment sets the priority of the pixels used to calculate the exposure control amount based on a feature quantity (for example, edge intensity) of each pixel that is different from the luminance value itself in the image signal before image recognition. That is, according to the present embodiment, pixels that are likely to correspond to the target of image recognition or monitoring and are suitable as the basis for exposure control can be arbitrarily extracted (that is, without image recognition or region setting) based on their feature quantities. Therefore, according to the present embodiment, appropriate exposure control can be performed quickly and with high accuracy through a simpler process.

Modifications

The present disclosure is not limited to the above embodiment. Therefore, the above embodiments can be modified as appropriate. Typical modified examples will be described below. In the following description of the modified examples, the differences from the above embodiment will be mainly discussed. Further, the same or equivalent parts of the above-described embodiment and the modified examples are designated by the same reference numerals. Therefore, in the following description of the modified examples, regarding the elements having the same reference numerals as those of the above embodiment, the description given in connection with the above embodiment can be applied as appropriate unless there is technical contradiction or particular additional mention.

The present disclosure is not limited to the specific device configuration described with regard to the above embodiment. For example, the camera system 2 of the above embodiment is installed in a vehicle V. However, the present disclosure is not limited to such mode. Specifically, for example, the present disclosure can be suitably applied to a camera system 2 installed in a moving object other than the vehicle V (for example, a flying object such as a drone). That is, the present disclosure may be suitably applied when the position and/or proportion of a pixel region in each frame image corresponding to the background region such as the sky, which is unlikely to be the target of image recognition or visual monitoring, may change relatively frequently.

In the above embodiment, the camera system 2 combines the function as a drive recorder or an event data recorder and the function as a vehicle surroundings monitoring system used for automated parking, advanced driving assistance, or automated driving. That is, the imaging section 7 combines a camera for the drive recorder or event data recorder and a camera for AD/ADAS. AD is an abbreviation for Automated Driving. ADAS is an abbreviation for Advanced Driver Assistance System.

However, the present disclosure is not limited to such mode. For example, the camera system 2 may be configured to have only the function as a drive recorder or event data recorder. That is, the imaging section 7 may be a camera for the drive recorder or event data recorder, more specifically, for example, a camera facing front provided in the vehicle V. In this case, the vehicle control system 4, the image processing section 82, and the recognition processing section 83 may be omitted. Further, in this case, the exposure control section 81 and the processing section 8 can be regarded as the same section.

Alternatively, for example, the camera system 2 may not have the function as a drive recorder or event data recorder. In other words, the camera system 2 may be configured as a vehicle surroundings monitoring system used for automated parking, advanced driving assistance, or automated driving. That is, the imaging section 7 may be a camera for AD/ADAS included in an AD/ADAS sensor.

The imaging section 7 and the processing section 8 may be placed in the same housing. Alternatively, the imaging section 7 and the processing section 8 may be placed in separate housings.

For example, the exposure control section 81 may be provided on the imaging section 7 side. Further, for example, the recognition processing section 83 may be provided outside the processing section 8, specifically, in the sensing system 3 or the vehicle control system 4.

The processing section 8 may include a digital circuit configured to enable the above-mentioned operations, for example, it may include an ASIC or FPGA. ASIC is an abbreviation for Application Specific Integrated Circuit. FPGA is an abbreviation for Field Programmable Gate Array. That is, the in-vehicle microprocessor part and the digital circuit part may both be provided in the processing section 8.

The program according to the present disclosure that enables various operations, procedures, or processes described in connection with the above embodiment may be downloaded or upgraded via V2X communication. Alternatively, such a program may be downloaded or upgraded via terminal equipment provided in a manufacturing plant of the vehicle V, a repair shop, a dealership, and so on. The program may be stored in a memory card, an optical disk, a magnetic disk, and so on.

Thus, each of the above-described functional configurations and methods may be implemented by a dedicated computer provided by configuring a processor programmed to execute one or more functions embodied by computer programs and a memory. Alternatively, each of the functional configurations and methods described above may be implemented by a dedicated computer provided by configuring a processor with one or more dedicated hardware logic circuits. Alternatively, each of the functional configurations and methods described above may be implemented by one or more dedicated computers configured by combining a processor programmed to execute one or more functions and a memory, with a processor configured by one or more hardware logic circuits.

Further, the computer program may be stored in a computer-readable non-transitory tangible storage medium as instructions executed by the computer. That is, each of the functional configurations and methods described above can be expressed as a computer program including procedures for implementing the configuration or method, or as a non-transitory tangible storage medium that stores the program.

The present disclosure is not limited to the specific modes of operations or modes of processing described with regard to the above embodiment. For example, in the above embodiment, as shown in FIGS. 2 and 3, the value of mask is not 0 in the region where the value of edge is small. Therefore, in the above embodiment, the influence α2 of the pixels having small feature quantities on the exposure control amount is greater than 0. However, the present disclosure is not limited to such mode.

Figure 5:
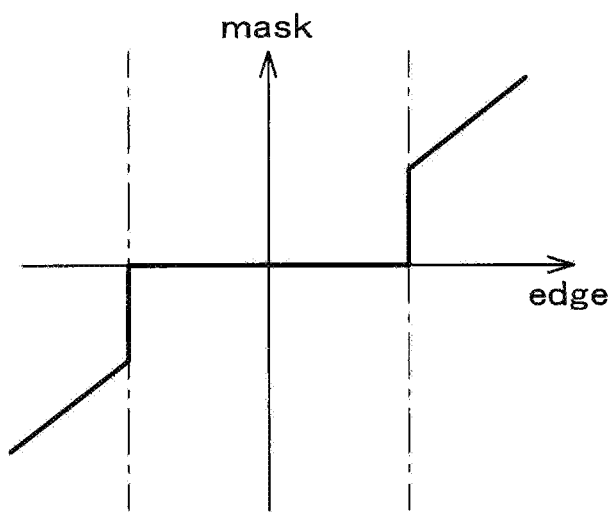
FIG. 5 is a graph showing another example of the priority setting process performed by the priority setting section shown in FIG. 1.

FIG. 5 is a modification of the mode of weighting shown in FIG. 3. As shown in FIG. 5, in this modification, the value of mask is 0 in the region where the value of edge is smaller than the threshold value. Therefore, in this case, the influence α2 of the pixels, whose edge values are smaller than the threshold and whose values of mask are 0, on the exposure control amount is 0.

That is, in this case, the priority setting section 813 selects feature pixels as the target pixels (pixels used to calculate the exposure control amount). Feature pixels are pixels whose feature quantities are equal to or greater than a threshold. As with the above case, the priority setting section 813 can be evaluated as a section that sets the priority, i.e., weighting, so that pixels having feature quantities equal to or larger than the threshold are preferentially used to calculate the exposure control amount.

FIG. 6 shows an example of the exposure control process corresponding to FIG. 5. The processing of steps 601 to 602 in FIG. 6 is the same as the processing of steps 401 to 402 in FIG. 4. Further, the processing of steps 604 to 605 in FIG. 6 is the same as the processing of steps 404 to 405 in FIG. 4.

In step 603, the exposure control section 81 sets priority in accordance with the feature quantities so that the luminance values of pixels with higher calculated feature quantities are preferentially used for the calculation of the exposure control amount. Specifically, in this modified example, the exposure control section 81 selects feature pixels which are pixels with feature quantities equal to or greater than the threshold as the target pixels (pixels used to calculate the exposure control amount).

The processing of step 603 corresponds to the operation of the priority setting section 813, that is, the processing for setting priority. Alternatively, the processing of step 403 can be evaluated as corresponding to the operation of a "target pixel selection section" which preferentially selects the feature pixels as the target pixels. Therefore, in this modification, the priority setting section 813 may also be referred to as a "target pixel selection section".

In the modification shown in FIGS. 5 and 6, target pixels may include adjacent pixels, which are pixels included in a predetermined range from feature pixels. That is, the priority setting section 813 or the target pixel selection section may select feature pixels and adjacent pixels, which are pixels within a predetermined range from feature pixels, as the target pixels.

Weighting is not necessarily required. For example, in FIG. 5, the values of mask[x][y] can be set to change stepwise or in a rectangular waveform when crossing the threshold. That is, the priority setting may be simply setting selected/not selected. Therefore, it can be said that the following technical aspects are disclosed in the present disclosure.

According to the first aspect, an exposure control device (8) for controlling exposure of an imaging section (7) installed in a moving object (V) includes:

a feature quantity calculation section (812) configured to calculate feature quantities of a plurality of pixels in a frame image acquired by the imaging section which are different from luminance values;

a target pixel selection section (813) configured to preferentially select one or more pixels having high feature quantities calculated by the feature quantity calculation section as one or more target pixels which are pixels used to calculate an exposure control amount; and a control amount calculation section (814) configured to calculate the exposure control amount based on the luminance values of the target pixels selected by the target pixel selection section.

An exposure control method for controlling exposure of an imaging section (7) installed in a moving object (V) includes:

processing of calculating feature quantities of a plurality of pixels in a frame image acquired by the imaging section which are different from luminance values;

processing of preferentially selecting one or more pixels having high calculated feature quantities as one or more target pixels which are pixels used to calculate an exposure control amount; and processing of calculating the exposure control amount based on the luminance values of the selected target pixels.

An exposure control program executed by an exposure control device (8) for controlling exposure of an imaging section (7) installed in a moving object (V), processing carried out by the exposure control device including:

processing of calculating feature quantities of a plurality of pixels in a frame image acquired by the imaging section which are different from luminance values;

processing of preferentially selecting one or more pixels having high calculated feature quantities as one or more target pixels which are pixels used to calculate an exposure control amount; and processing of calculating the exposure control amount based on the luminance values of the selected target pixels.

According to the second aspect, the target pixel selection section selects one or more pixels with feature quantities equal to or larger than a threshold as the one or more target pixels. The processing of selecting the one or more target pixels is processing of selecting one or more pixels with feature quantities equal to or larger than a threshold as the one or more target pixels.

According to the third aspect, the target pixel selection section selects one or more feature pixels, which are pixels with feature quantities equal to or larger than the threshold, and one or more adjacent pixels, which are pixels within a predetermined range from the feature pixels as the target pixels. The processing of selecting the one or more target pixels is processing of selecting one or more feature pixels, which are pixels with feature quantities equal to or larger than the threshold, and one or more adjacent pixels, which are pixels within a predetermined range from the feature pixels as the target pixels.

According to the fourth aspect, the feature quantity is edge information representing a relationship between pixel values of a pixel of interest and a pixel around the pixel of interest.

It goes without saying that the elements of the above-described embodiments are not necessarily essential unless expressly stated otherwise or it is considered to be obviously essential in principle, etc. In addition, when a numerical value such as the number, value, amount, or range of an element(s) is mentioned, the present disclosure is not limited to the particular number unless expressly stated otherwise or it is obviously limited to the particular number in principle, etc. Similarly, when the shape, direction, positional relationship, or the like of an element(s) or the like is mentioned, the present disclosure is not limited to the shape, direction, positional relationship, or the like unless explicitly stated otherwise or it is limited to the specific shape, direction, positional relationship, or the like in principle, etc.

Modified examples are also not limited to the above examples. For example, all or a part of one of the embodiments may be combined with all or a part of another embodiment unless they technically contradict each other. There is no particular limitation on the number of embodiments to be combined. Similarly, all or a part of one of the modified examples may be combined with all or a part of another modified example unless they technically contradict each other. Further, all or a part of one of the embodiments may be combined with all or a part of one of the modified examples unless they technically contradict each other.

Terms that have related or similar meanings, such as "generate", "calculate", "acquire", "sense", and "detect" may be compatible as long as there is no technical inconsistency. Paraphrasing of other terms may also be acceptable as long as there is no technical inconsistency.

"Equal to or greater than a threshold" and "exceed a threshold" may be compatible as long as there is no technical inconsistency. The same applies to "equal to or smaller than a threshold" and "below a threshold".

An exposure control device (8) is configured to control exposure of an imaging section (7) installed in a moving object (V).

The exposure control device includes:

a feature quantity calculation section (812) configured to calculate feature quantities of a plurality of pixels in a frame image acquired by the imaging section which are different from luminance values;

a priority setting section (813) configured to set priority in accordance with the feature quantities so that the luminance value(s) of one or more pixels with high feature quantities calculated by the feature quantity calculation section are preferentially used to calculate an exposure control amount; and a control amount calculation section (814) configured to calculate the exposure control amount based on the luminance values of the pixels and the priority set by the priority setting section.

An exposure control method is a method for controlling exposure of an imaging section (7) installed in a moving object (V), the method including:

processing of calculating feature quantities of a plurality of pixels in a frame image acquired by the imaging section which are different from luminance values;

processing of setting priority in accordance with the feature quantities so that the luminance value(s) of one or more pixels with high calculated feature quantities are preferentially used to calculate an exposure control amount; and processing of calculating the exposure control amount based on the luminance values of the pixels and the set priority.

A storage medium in which an exposure control program for controlling exposure of an imaging section installed in a moving object is stored to cause a computer (8) to execute processing, the processing including:

processing of calculating feature quantities of a plurality of pixels in a frame image acquired by the imaging section which are different from luminance values;

processing of setting priority in accordance with the feature quantities so that the luminance value(s) of one or more pixels with high calculated feature quantities are preferentially used to calculate an exposure control amount; and processing of calculating the exposure control amount based on the luminance values of the pixels and the set priority.

The documents of this application may contain reference numerals in parentheses assigned to elements. However, such reference numerals simply indicate examples of the correspondence between the elements and specific means described in connection with embodiments described above. Therefore, the present disclosure is not limited by the above reference numerals.

What is claimed is:

1. An exposure control device for controlling exposure of an imaging section installed in a moving object, the device comprising:

a feature quantity calculation section configured to calculate feature quantities of a plurality of pixels in a frame image acquired by the imaging section which are different from luminance values;

a priority setting section configured to set priority in accordance with the feature quantities so that the luminance value(s) of one or more pixels with high feature quantities calculated by the feature quantity calculation section are preferentially used to calculate an exposure control amount; and a control amount calculation section configured to calculate the exposure control amount based on the luminance values of the pixels and the priority set by the priority setting section.

2. The exposure control device according to claim 1, wherein the priority setting section sets the priority so that one or more pixels having feature quantities equal to or larger than a threshold are preferentially used to calculate the exposure control amount.

3. The exposure control device according to claim 2, wherein the priority is weighting.

4. The exposure control device according to claim 2, wherein the priority setting section selects one or more feature pixels, which are pixels with feature quantities equal to or greater than the threshold, as one or more target pixels, which are pixels used to calculate the exposure control amount.

5. The exposure control device according to claim 4, wherein the priority setting section selects the one or more feature pixels and one or more adjacent pixels, which are pixels within a predetermined range from the feature pixels, as the target pixels.

6. The exposure control device according to claim 1, wherein the feature quantity is edge information representing a relationship between pixel values of a pixel of interest and a pixel around the pixel of interest.

7. An exposure control method for controlling exposure of an imaging section installed in a moving object, the method comprising:

processing of calculating feature quantities of a plurality of pixels in a frame image acquired by the imaging section which are different from luminance values;

processing of setting priority in accordance with the feature quantities so that the luminance value(s) of one or more pixels with high calculated feature quantities are preferentially used to calculate an exposure control amount; and processing of calculating the exposure control amount based on the luminance values of the pixels and the set priority.

8. The exposure control method according to claim 7, wherein the processing of setting the priority is processing of setting the priority so that one or more pixels having feature quantities equal to or larger than a threshold are preferentially used to calculate the exposure control amount.

9. The exposure control method according to claim 8, wherein the priority is weighting.

10. The exposure control method according to claim 8, wherein the processing of setting the priority is processing of selecting one or more feature pixels, which are pixels with feature quantities equal to or greater than the threshold, as one or more target pixels, which are pixels used to calculate the exposure control amount.

11. The exposure control method according to claim 10, wherein the processing of setting the priority is processing of selecting the one or more feature pixels and one or more adjacent pixels, which are pixels within a predetermined range from the feature pixels, as the target pixels.

12. The exposure control method according to claim 7, wherein, the feature quantity is edge information representing a relationship between pixel values of a pixel of interest and a pixel around the pixel of interest.

13. A non-transitory storage medium in which an exposure control program for controlling exposure of an imaging section installed in a moving object is stored to cause a computer to execute processing, the processing comprises: processing of calculating feature quantities of a plurality of pixels in a frame image acquired by the imaging section which are different from luminance values; processing of setting priority in accordance with the feature quantities so that the luminance value(s) of one or more pixels with high calculated feature quantities are preferentially used to calculate an exposure control amount; and processing of calculating the exposure control amount based on the luminance values of the pixels and the set priority.

14. The non-transitory storage medium according to claim 13, wherein the processing of setting the priority is processing of setting the priority so that one or more pixels having feature quantities equal to or larger than a threshold are preferentially used to calculate the exposure control amount.

15. The non-transitory storage medium according to claim 14, wherein the priority is weighting.

16. The non-transitory storage medium according to claim 14, wherein the processing of setting the priority is processing of selecting one or more feature pixels, which are pixels with feature quantities equal to or greater than the threshold, as one or more target pixels, which are pixels used to calculate the exposure control amount.

17. The non-transitory storage medium according to claim 16, wherein the processing of setting the priority is processing of selecting the one or more feature pixels and one or more adjacent pixels, which are pixels within a predetermined range from the feature pixels, as the target pixels.

18. The non-transitory storage medium according to claim 13, wherein the feature quantity is edge information representing a relationship between pixel values of a pixel of interest and a pixel around the pixel of interest.

* * * * *